(12) United States Patent
Lee et al.

(10) Patent No.: US 11,510,088 B2
(45) Date of Patent: Nov. 22, 2022

(54) METHOD AND APPARATUS FOR MANAGING MEASUREMENT RESULTS FOR EARLY MEASUREMENT IN A WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 17/098,197

(22) Filed: Nov. 13, 2020

(65) Prior Publication Data
US 2021/0153055 A1 May 20, 2021

(30) Foreign Application Priority Data
Nov. 15, 2019 (KR) ........................ 10-2019-0146566

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC ..... H04W 24/00; H04W 24/08; H04W 24/10; H04W 48/16
See application file for complete search history.

(56) References Cited

U.S. PATENT DOCUMENTS

| | | | | |
|---|---|---|---|---|
| 8,593,990 B1 * | 11/2013 | Henttonen | ...... | H04W 36/00835 455/437 |
| 11,096,081 B2 * | 8/2021 | Kim | ...................... | H04W 76/27 |
| 11,246,052 B2 * | 2/2022 | Wang | ..................... | H04W 36/08 |
| 2018/0084465 A1 * | 3/2018 | Jung | ...................... | H04W 36/08 |
| 2020/0252823 A1 * | 8/2020 | Kim | ...................... | H04W 48/16 |
| 2020/0260308 A1 * | 8/2020 | Jin | ........................ | H04L 5/0094 |
| 2021/0105647 A1 * | 4/2021 | Lee | ................... | H04W 36/0094 |
| 2021/0105649 A1 * | 4/2021 | Lee | ........................ | H04W 76/27 |

FOREIGN PATENT DOCUMENTS

EP 3846544 A1 * 7/2021 ............ H04W 24/02

* cited by examiner

*Primary Examiner* — Chi H Pham
*Assistant Examiner* — Weibin Huang
(74) *Attorney, Agent, or Firm* — Lee Hong Degerman Kang Waimey

(57) ABSTRACT

A method and apparatus for managing measurement results for early measurement in a wireless communication system is provided. A wireless device receives, from a network, measurement configuration for early measurement, wherein the measurement configuration includes 1) a first frequency group for a first Radio Access Technology (RAT), and 2) a second frequency group for a second RAT. A wireless device transmits a measurement report including the measurements results of only one of the first frequency group and the second frequency group. A wireless device discards the stored measurement results of the other one of the first frequency group and the second frequency group which are not transmitted to the network.

8 Claims, 13 Drawing Sheets

METHOD AND APPARATUS FOR MANAGING MEASUREMENT RESULTS FOR EARLY MEASUREMENT IN A WIRELESS COMMUNICATION SYSTEM

CROSS-REFERENCE TO RELATED APPLICATIONS

Pursuant to 35 U.S.C. § 119 (a), this application claims the benefit of earlier filing date and right of priority to Korean Patent Application No. 10-2019-0146566, filed on Nov. 15, 2019, the contents of which are all hereby incorporated by reference herein in its entirety.

TECHNICAL FIELD

The present disclosure relates to a method and apparatus for managing measurement results for early measurement in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

When a wireless device is in idle state and/or inactive state, the wireless device may perform neighbour cell measurement to support mobility. For example, a wireless device may perform early measurement on NR frequencies and/or LTE frequencies in idle state and/or inactive state.

When a wireless device reports any available idle mode measurement results to the network after receiving request from the network, the UE may delete the measurement results only if the results are successfully delivered.

However, in early measurements, a wireless device could report only one of measurement results on the NR frequencies or measurement results on the LTE frequencies. In this case, the other measurement results which is not reported could be outdated.

Therefore, studies for managing measurement results for early measurement in a wireless communication system are needed.

In an aspect, a method performed by a wireless device in a wireless communication system is provided. A wireless device receives, from a network, measurement configuration for early measurement, wherein the measurement configuration includes 1) a first frequency group for a first Radio Access Technology (RAT), and 2) a second frequency group for a second RAT. A wireless device transmits a measurement report including the measurements results of only one of the first frequency group and the second frequency group. A wireless device discards the stored measurement results of the other one of the first frequency group and the second frequency group which are not transmitted to the network.

In another aspect, an apparatus for implementing the above method is provided.

The present disclosure can have various advantageous effects.

According to some embodiments of the present disclosure, a wireless device could manage measurement results for early measurement efficiently in a wireless communication system.

For example, when a wireless device receives early measurement configuration with frequency list of NR frequencies and E-UTRA frequencies, the wireless device may perform early measurement on all the configured frequencies and store the measurement results. When the wireless device transit to RRC_CONNECTED and if the network requests to report the measurement results with indication to report only measurement results of NR frequencies, then measurement results of LTE frequencies are not reported to the network. If only the measurement results of NR frequencies are discarded after reporting, a wireless device could waste resources for the stored measurement results of LTE frequencies. According to some embodiments of the present disclosure, a wireless device could save resources by discarding the stored measurement results which is not reported.

For example, a wireless communication system could provide an efficient way to manage measurement results for early measurement for a wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
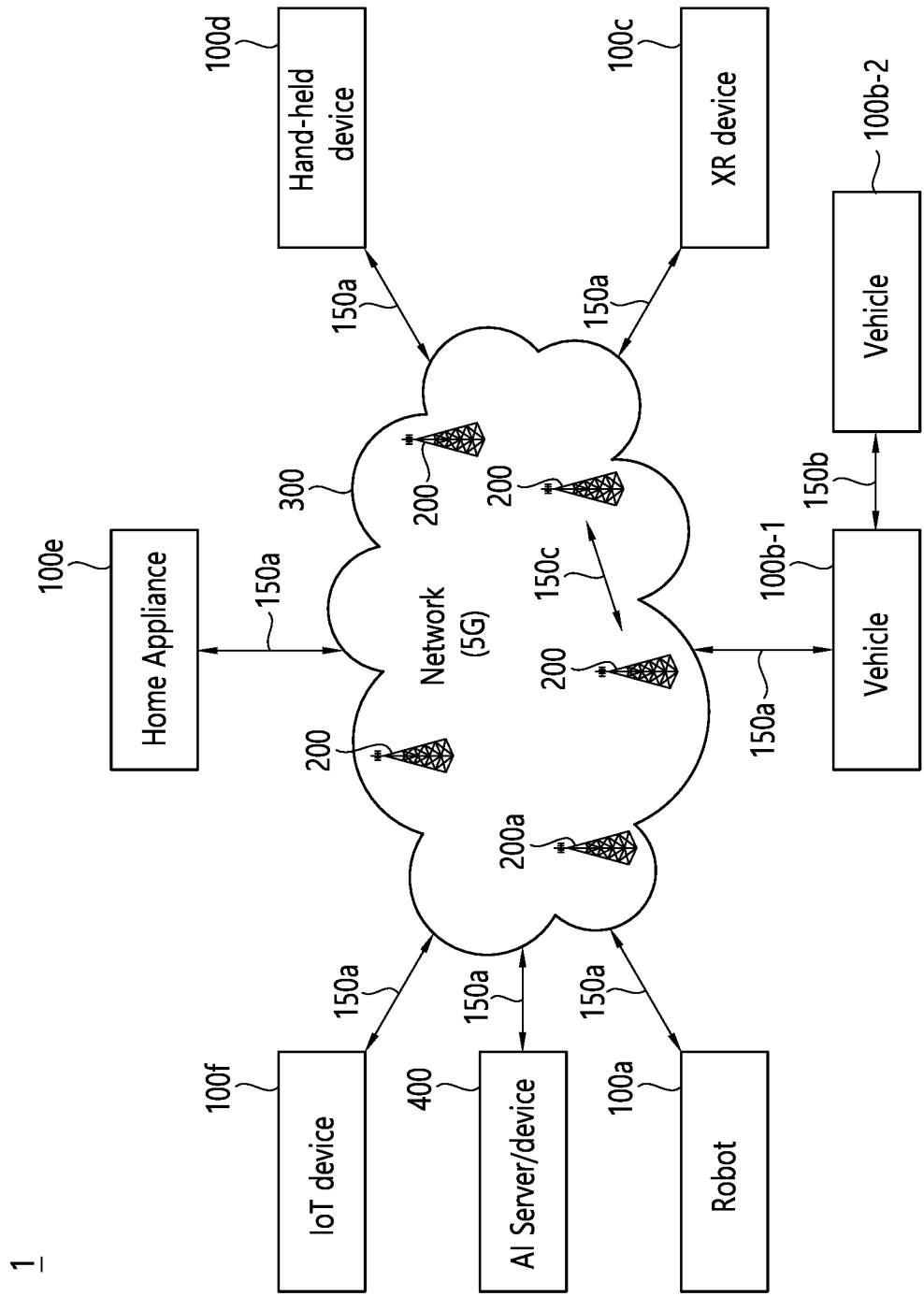
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B". In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
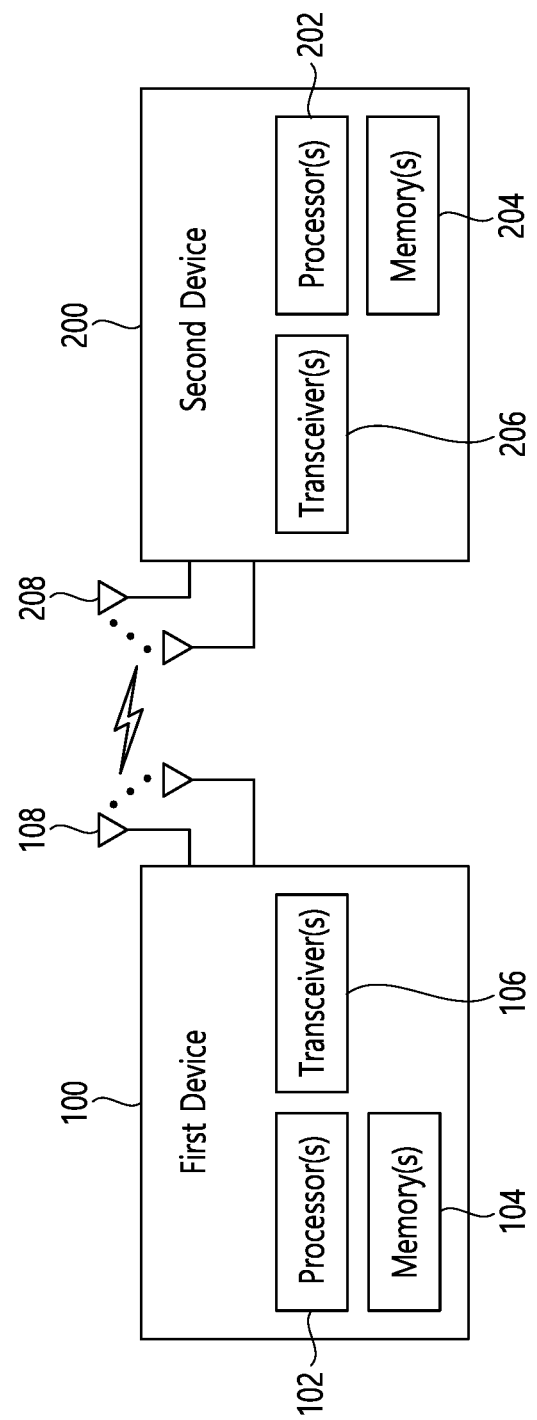
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
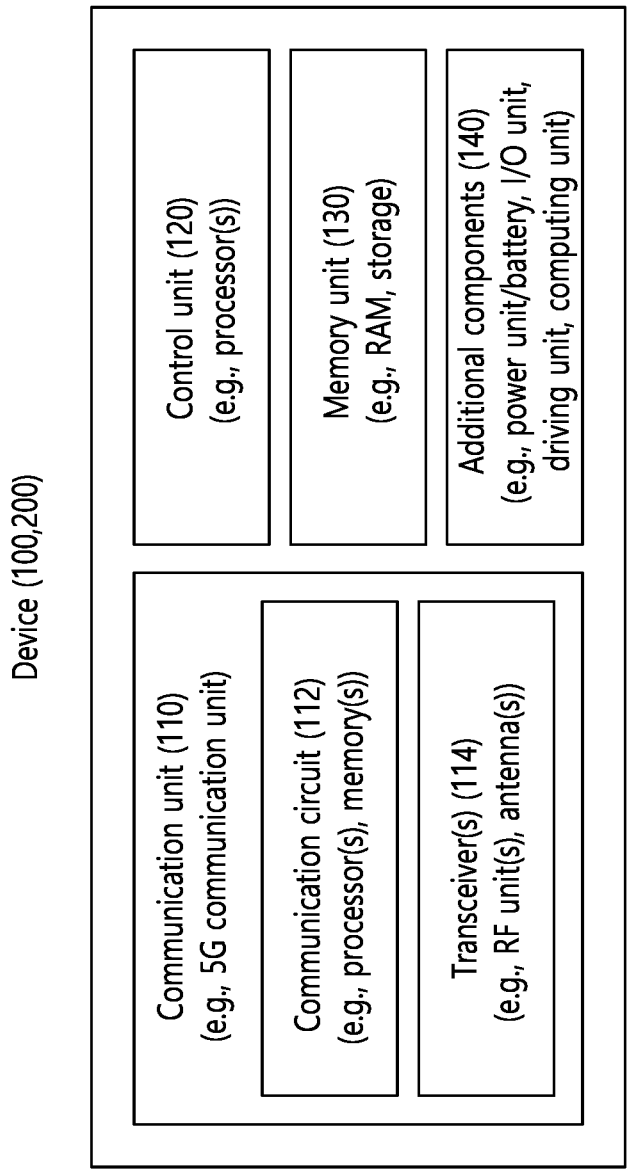
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110. The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
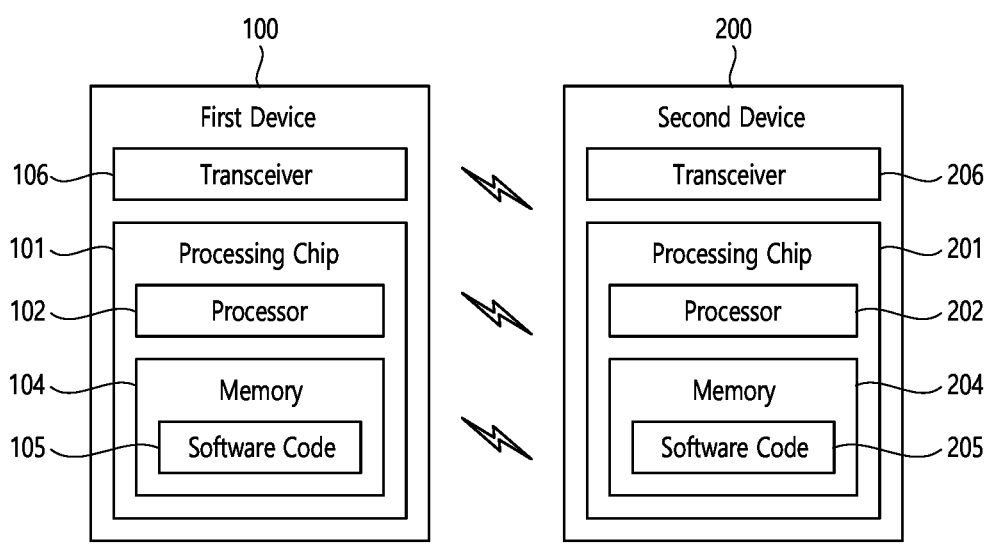
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
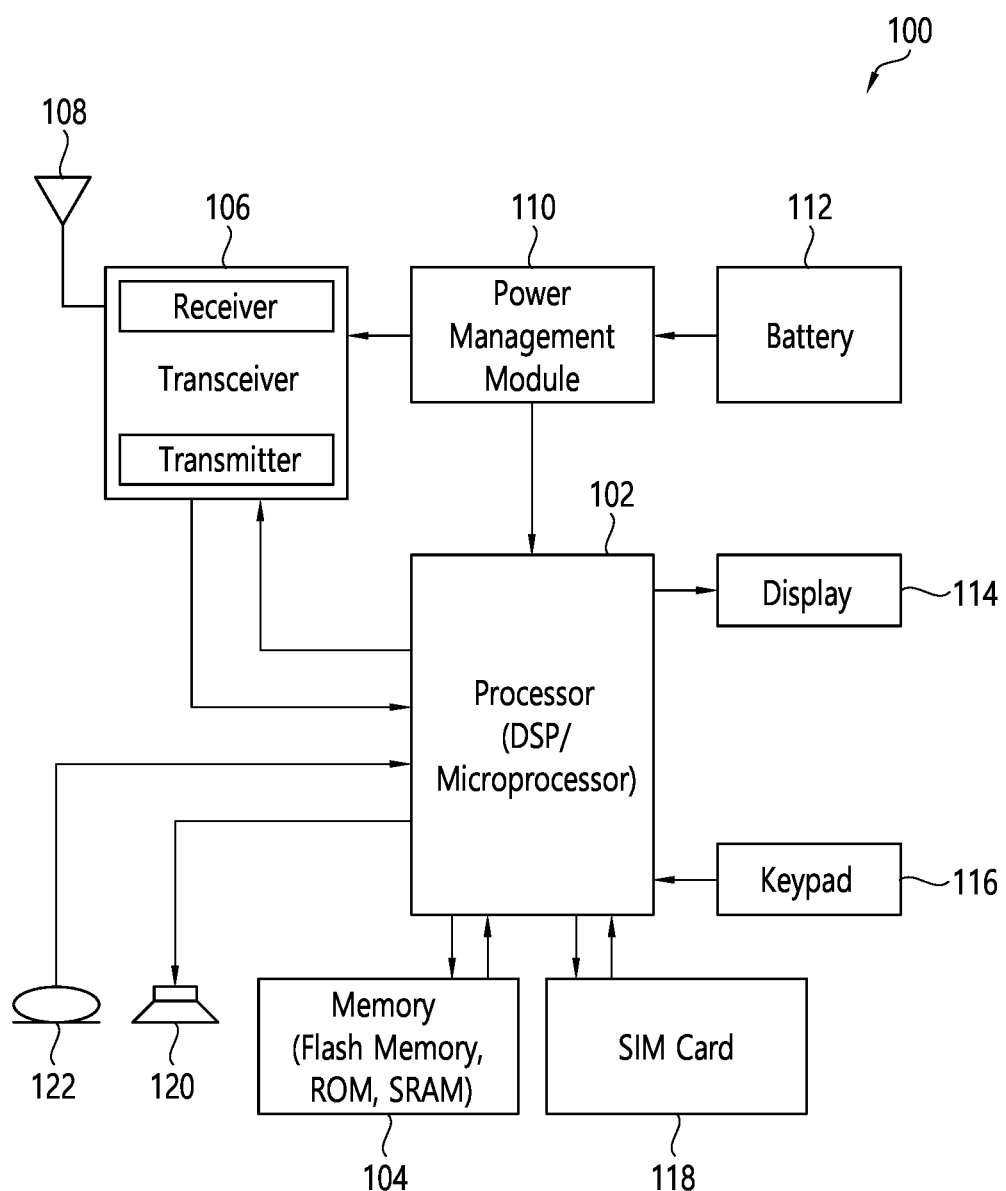
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
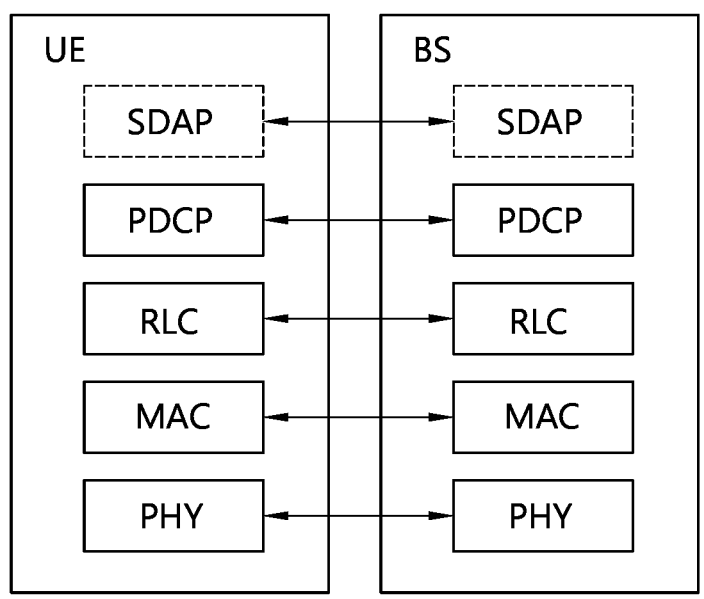
FIGS. 6 and 7 show an example of protocol stacks in a 3GPP based wireless communication system to which implementations of the present disclosure is applied.
Figure 7:
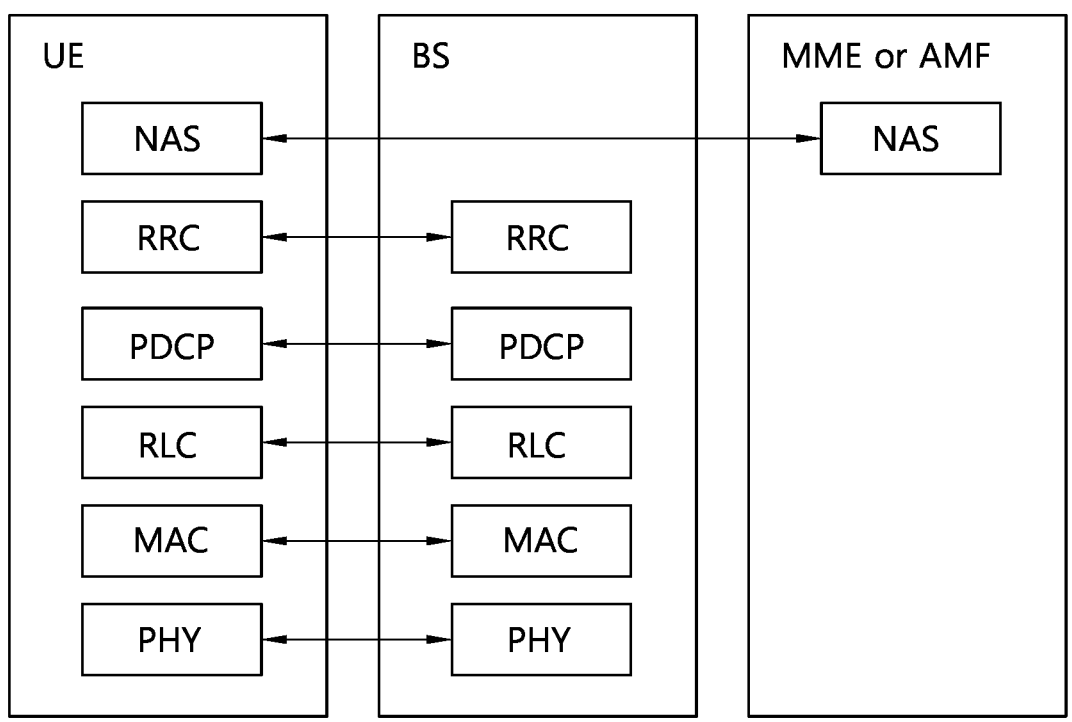

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
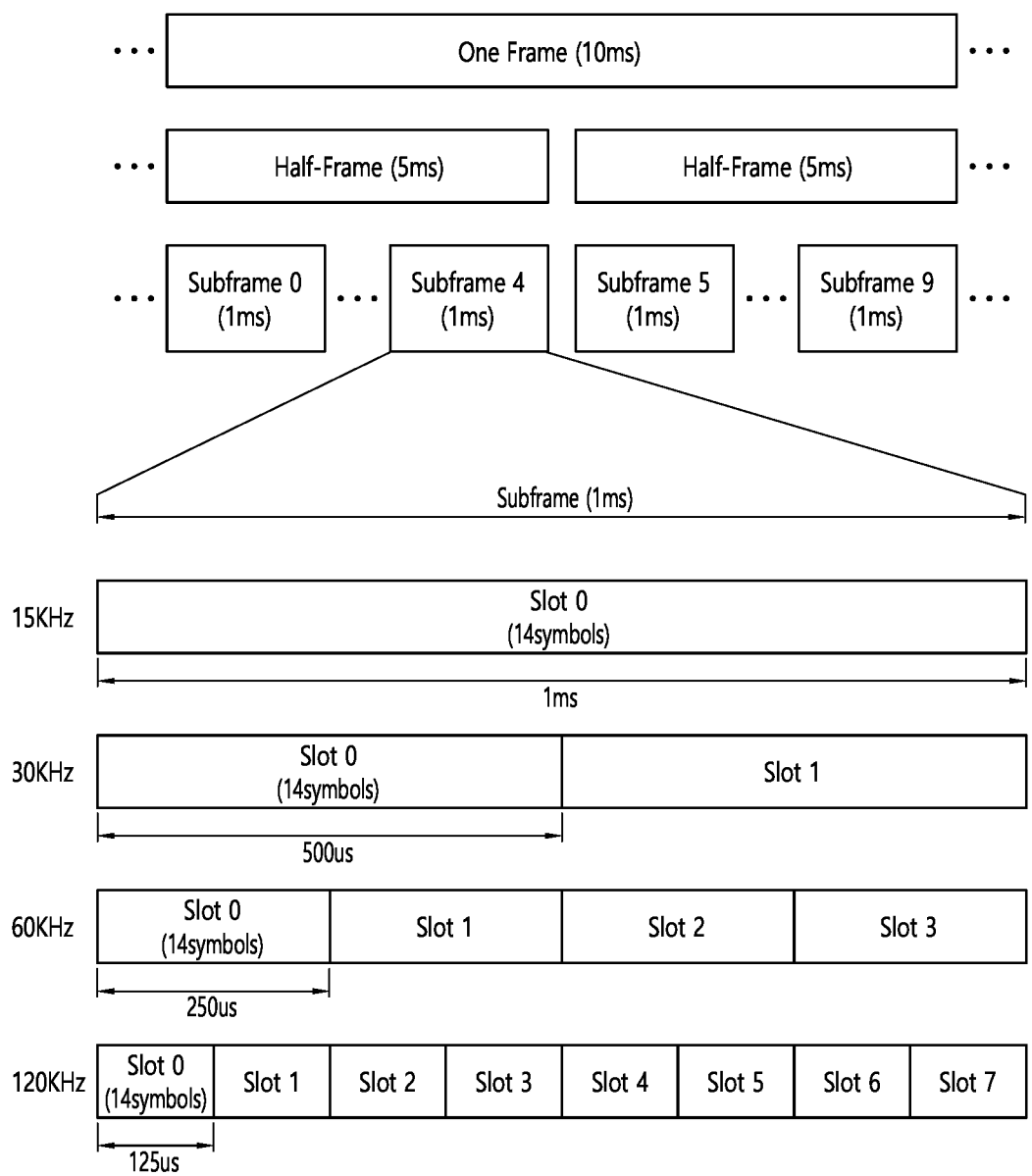
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| μ | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |

TABLE 1-continued

| μ | $N^{slot}_{symb}$ | $N^{frame,u}_{slot}$ | $N^{subframe,u}_{slot}$ |
|---|---|---|---|
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| μ | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block nPRB in the bandwidth part i and the common resource block $n_{CRB}$ is as follows: $n_{PRB}=n_{CRB} N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
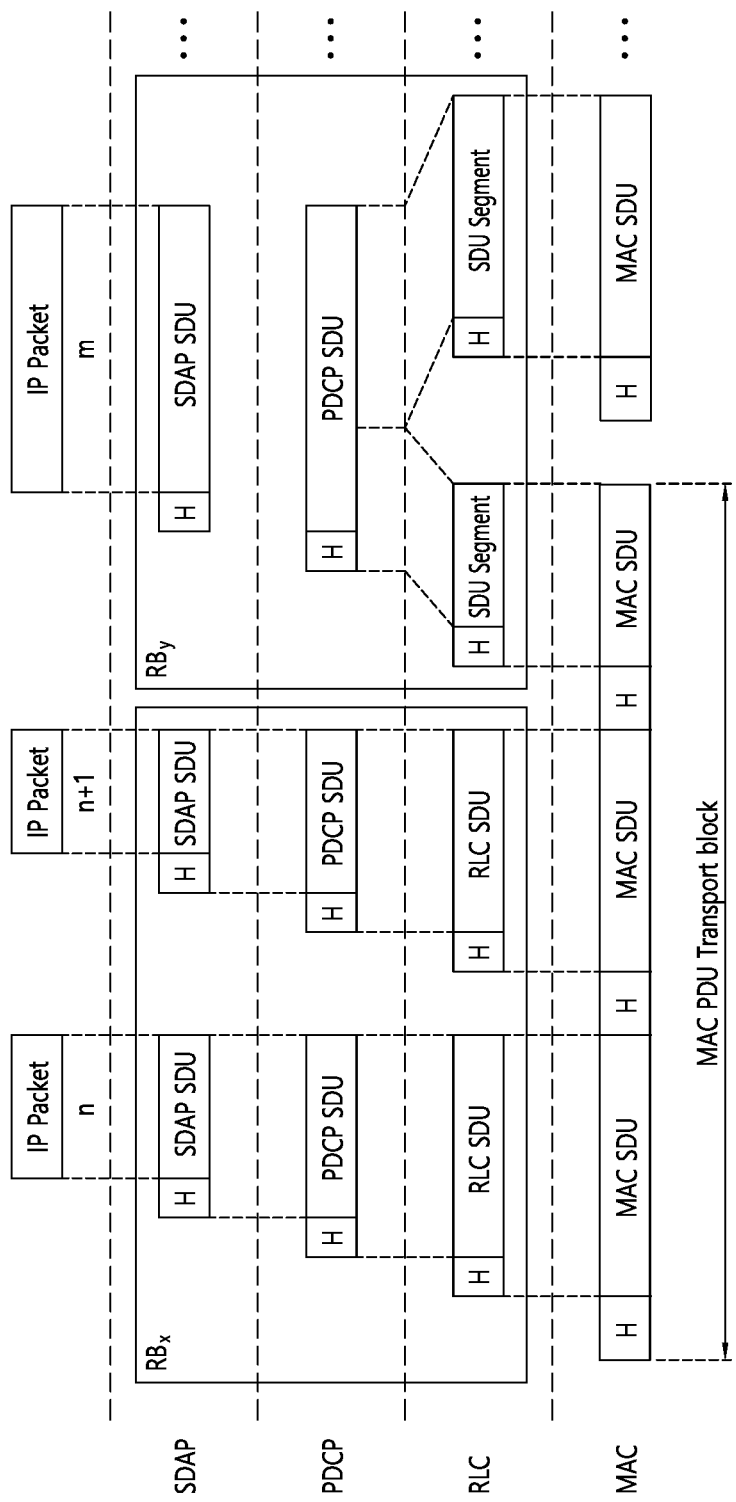
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, RRC Connection Release procedure is described.

The purpose of this procedure is:

- to release the RRC connection, which includes the release of the established radio bearers as well as all radio resources; or
- to suspend the RRC connection only if Signalling Radio Bearer 2 (SRB2) and at least one Data Radio Bearer (DRB) are setup, which includes the suspension of the established radio bearers.

The network initiates the RRC connection release procedure to transit a UE in RRC_CONNECTED to RRC_IDLE; or to transit a UE in RRC_CONNECTED to RRC_INACTIVE only if SRB2 and at least one DRB is setup in RRC_CONNECTED; or to transit a UE in RRC_INACTIVE back to RRC_INACTIVE when the UE tries to resume; or to transit a UE in RRC_INACTIVE to RRC_IDLE when the UE tries to resume. The procedure can also be used to release and redirect a UE to another frequency.

Upon Reception of the RRCRelease by the UE, the UE shall:

1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if the AS security is not activated:
2> ignore any field included in RRCRelease message except waitTime;
2> perform the actions upon going to RRC_IDLE with the release cause 'other' upon which the procedure ends;
1> if the RRCRelease message includes redirectedCarrierInfo indicating redirection to eutra:
2> if cnType is included:
3> after the cell selection, indicate the available CN Type(s) and the received cnType to upper layers;
1> if the RRCRelease message includes the cellReselectionPriorities:
2> store the cell reselection priority information provided by the cellReselectionPriorities;
2> if the t320 is included:
3> start timer T320, with the timer value set according to the value of t320;
1> else:
2> apply the cell reselection priority information broadcast in the system information;
1> if deprioritisationReq is included:
2> start or restart timer T325 with the timer value set to the deprioritisationTimer signalled;
2> store the deprioritisationReq until T325 expiry;
1> if the RRCRelease includes suspendConfig:
2> apply the received suspendConfig;
2> reset MAC and release the default MAC Cell Group configuration, if any;
2> re-establish RLC entities for SRB1;
2> if the RRCRelease message with suspendConfig was received in response to an RRCResumeRequest or an RRCResumeRequest1:
3> stop the timer T319 if running;
3> in the stored UE Inactive AS context:
4> replace the $K_{gNB}$ and $K_{RRCint}$ keys with the current $K_{gNB}$ and $K_{RRCint}$ keys;
4> replace the C-RNTI with the temporary C-RNTI in the cell the UE has received the RRCRelease message;
4> replace the cellIdentity with the cellIdentity of the cell the UE has received the RRCRelease message;
4> replace the physical cell identity with the physical cell identity of the cell the UE has received the RRCRelease message;
2> else:
3> store in the UE Inactive AS Context the current $K_{gNB}$ and $K_{RRCint}$ keys, the ROHC state, the C-RNTI used in the source PCell, the cellIdentity and the physical cell identity of the source PCell, and all other parameters configured except for the ones within ReconfigurationWithSync and servingCellConfigCommonSIB;
2> suspend all SRB(s) and DRB(s), except SRB0;
2> indicate PDCP suspend to lower layers of all DRBs;
2> if the t380 is included:
3> start timer T380, with the timer value set to t380;
2> if the RRCRelease message is including the waitTime:
3> start timer T302 with the value set to the waitTime;
3> inform upper layers that access barring is applicable for all access categories except categories '0' and '2';
2> if T390 is running:
3> stop timer T390 for all access categories;
2> indicate the suspension of the RRC connection to upper layers;
2> enter RRC_INACTIVE and perform cell selection;
1> else
2> perform the actions upon going to RRC_IDLE, with the release cause 'other'.

Upon T320 expiry, the UE shall:
1> if T320 expires:
2> if stored, discard the cell reselection priority information provided by the cellReselectionPriorities or inherited from another RAT;
2> apply the cell reselection priority information broadcast in the system information.

Upon receiving the expiry of DataInactivityTimer from lower layers while in RRC_CONNECTED, the UE shall:
1> perform the actions upon going to RRC_IDLE, with release cause 'RRC connection failure'.

The purpose of RRC connection release requested by upper layers is to release the RRC connection. Access to the current Primary Cell (PCell) may be barred as a result of this procedure.

The UE initiates the procedure when upper layers request the release of the RRC connection. The UE shall not initiate the procedure for power saving purposes.

The UE shall:
1> if the upper layers indicate barring of the PCell:
2> treat the PCell used prior to entering RRC_IDLE as barred;
1> perform the actions upon going to RRC_IDLE, with release cause 'other'.

Hereinafter, UE actions upon going to RRC_IDLE are described.

The UE shall:
1> reset MAC;
1> if going to RRC_IDLE was triggered by reception of the RRCRelease message including a waitTime:
2> if T302 is running:
3> stop timer T302;
2> start timer T302 with the value set to the waitTime;
2> inform upper layers that access barring is applicable for all access categories except categories '0' and '2'.
1> else:
2> if T302 is running:
3> stop timer T302;
1> if T390 is running:
2> stop timer T390 for all access categories;
1> if the UE is leaving RRC_INACTIVE:
2> if going to RRC_IDLE was not triggered by reception of the RRCRelease message:
3> if stored, discard the cell reselection priority information provided by the cellReselectionPriorities;
3> stop the timer T320, if running;
1> stop all timers that are running except T302, T320 and T325;
1> discard the UE Inactive AS context, if any;
1> release the suspendConfig, if configured;
1> set the variable pendingRnaUpdate to false, if that is set to true;
1> discard the $K_{gNB}$ key, the S-$K_{gNB}$ key, the S-$K_{eNB}$ key, the $K_{RRCenc}$ key, the $K_{RRCint}$ key, the $K_{UPint}$ key and the $K_{UPenc}$ key, if any;
1> release all radio resources, including release of the RLC entity, the MAC configuration and the associated PDCP entity and SDAP for all established RBs;
1> indicate the release of the RRC connection to upper layers together with the release cause;
1> enter RRC_IDLE and perform cell selection, except if going to RRC_IDLE was triggered by inter-RAT cell reselection while the UE is in RRC_INACTIVE or when selecting an inter-RAT cell while T311 was running;

Hereinafter, RRC_IDLE state and RRC_INACTIVE state.

The RRC_IDLE state and RRC_INACTIVE state tasks can be subdivided into three processes:
Public Land Mobile Network (PLMN) selection;
Cell selection and reselection;
Location registration and RAN Notification Area (RNA) update.

PLMN selection, cell reselection procedures, and location registration are common for both RRC_IDLE state and RRC_INACTIVE state. RNA update is only applicable for RRC_INACTIVE state. When UE selects a new PLMN, UE transitions from RRC_INACTIVE to RRC_IDLE.

When a UE is switched on, a public land mobile network (PLMN) is selected by Non-Access Stratum (NAS). For the selected PLMN, associated Radio Access Technology (RAT) may be set. The NAS shall provide a list of equivalent PLMNs, if available, that the AS shall use for cell selection and cell reselection.

With cell selection, the UE searches for a suitable cell of the selected PLMN, chooses that cell to provide available services, and monitors its control channel. This procedure is defined as "camping on the cell".

The UE shall, if necessary, then register its presence, by means of a NAS registration procedure, in the tracking area of the chosen cell. As an outcome of a successful Location Registration, the selected PLMN then becomes the registered PLMN.

If the UE finds a more suitable cell, according to the cell reselection criteria, it reselects onto that cell and camps on it. If the new cell does not belong to at least one tracking area to which the UE is registered, location registration is performed. In RRC_INACTIVE state, if the new cell does not belong to the configured RNA, an RNA update procedure is performed.

If necessary, the UE shall search for higher priority PLMNs at regular time intervals and search for a suitable cell if another PLMN has been selected by NAS.

If the UE loses coverage of the registered PLMN, either a new PLMN is selected automatically (automatic mode), or an indication of available PLMNs is given to the user so that a manual selection can be performed (manual mode).

Registration is not performed by UEs only capable of services that need no registration. The purpose of camping on a cell in RRC_IDLE state and RRC_INACTIVE state is fourfold:

a) It enables the UE to receive system information from the PLMN.

b) When registered and if the UE wishes to establish an RRC connection or resume a suspended RRC connection, it can do this by initially accessing the network on the control channel of the cell on which it is camped.

c) If the network needs to send a message or deliver data to the registered UE, it knows (in most cases) the set of tracking areas (in RRC_IDLE state) or RNA (in RRC_INACTIVE state) in which the UE is camped. It can then send a "paging" message for the UE on the control channels of all the cells in the corresponding set of areas. The UE will then receive the paging message and can respond.

d) It enables the UE to receive Earthquake and Tsunami Warning System (ETWS) and
Commercial Mobile Alert System (CMAS) notifications.

When the UE is in RRC_IDLE state, upper layers may deactivate AS layer when Mobile Initiated Connection Only (MICO) mode is activated. When MICO mode is activated, the AS configuration (e.g. priorities provided by dedicated signalling) is kept and all running timers continue to run but the UE need not perform any idle mode tasks. If a timer expires while MICO mode is activated it is up to the UE implementation whether it performs the corresponding action immediately or the latest when MICO mode is deactivated. When MICO mode is deactivated, the UE shall perform all idle mode tasks.

Hereinafter, states in RRC_IDLE state and/or RRC_INACTIVE state (1) Camped Normally State This state is applicable for RRC_IDLE and RRC_INACTIVE state.

When camped normally, the UE shall perform the following tasks:
monitor the paging channel of the cell according to information broadcast in SIB1;
monitor Short Messages transmitted with Paging Radio Network Temporary Identifier (P-RNTI) over Downlink Control Information (DCI);
monitor relevant System Information;
perform necessary measurements for the cell reselection evaluation procedure;
execute the cell reselection evaluation process on the following occasions/triggers:
1) UE internal triggers, so as to meet performance;
2) When information on the Broadcast Control Channel (BCCH) used for the cell reselection evaluation procedure has been modified.

(2) Selection of Cell at Transition to RRC_IDLE or RRC_INACTIVE State

At reception of RRCRelease message to transition the UE to RRC_IDLE or
RRC_INACTIVE, UE shall attempt to camp on a suitable cell according to redirectedCarrierInfo if included in the RRCRelease message. If the UE cannot find a suitable cell, the UE is allowed to camp on any suitable cell of the indicated RAT. If the RRCRelease message does not contain the redirectedCarrierInfo, UE shall attempt to select a suitable cell on an NR carrier. If no suitable cell is found according to the above, the UE shall perform cell selection using stored information in order to find a suitable cell to camp on.

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated RAT. If the RRCRelease message does not contain redirectedCarrierInfo UE shall attempt to select an acceptable cell on an NR frequency. If no acceptable cell is found according to the above, the UE shall continue to search for an acceptable cell of any PLMN in state any cell selection.

(3) Any Cell Selection State

This state is applicable for RRC_IDLE and RRC_INACTIVE state. In this state, the UE shall perform cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high-quality cell.

The UE, which is not camped on any cell, shall stay in this state.

(4) Camped on any Cell State

This state is only applicable for RRC_IDLE state. In this state, the UE shall perform the following tasks:

monitor Short Messages transmitted with P-RNTI over DCI;
monitor relevant System Information;
perform necessary measurements for the cell reselection evaluation procedure;
execute the cell reselection evaluation process on the following occasions/triggers:
1) UE internal triggers, so as to meet performance;
2) When information on the BCCH used for the cell reselection evaluation procedure has been modified.
regularly attempt to find a suitable cell trying all frequencies of all RATs that are supported by the UE. If a suitable cell is found, UE shall move to camped normally state.
if the UE supports voice services and the current cell does not support IP Multimedia Subsystem (IMS) emergency calls as indicated by the field ims-EmergencySupport in SIB1, the UE shall perform cell selection/reselection to an acceptable cell that supports emergency calls in any supported RAT regardless of priorities provided in system information from current cell, if no suitable cell is found.

IDLE mode measurements is described. It may be referred to as Section 5.6.20 of 3GPP TS 36.331 v15.6.0 (2019 Jun. 29).

This procedure specifies the measurements done by a UE in RRC_IDLE or RRC_INACTIVE when it has an IDLE mode measurement configuration and the storage of the available measurements by a UE in RRC_IDLE, RRC_INACTIVE and RRC_CONNECTED.

The IDLE mode measurement may be initiated as below.
While T331 is running, the UE shall:
1> perform the measurements in accordance with the following:
2> for each entry in measIdleCarrierListEUTRA within VarMeasIdleConfig:
3> if UE supports carrier aggregation between serving carrier and the carrier frequency and bandwidth indicated by carrierFreq and allowedMeasBandwidth within the corresponding entry;
4> perform measurements in the carrier frequency and bandwidth indicated by carrierFreq and allowedMeasBandwidth within the corresponding entry;
The fields s-NonIntraSearch in SystemInformationBlockType3 do not affect the UE measurement procedures in IDLE mode. How the UE performs measurements in IDLE mode is up to UE implementation. UE is not required to perform idle measurements if the SIB2 does not contain idleModeMeasurements.
4> if the measCellList is included:
5> consider the serving cell and cells identified by each entry within the measCellList to be applicable for idle mode measurement reporting;
4> else:
5> consider the serving cell and up to maxCellMeasIdle strongest identified cells whose RSRP/RSRQ measurement results are above the value(s) provided in qualityThreshold (if any) to be applicable for idle mode measurement reporting;
4> store measurement results for cells applicable for idle mode measurement reporting within the VarMeasIdleReport;
3> else:
4> do not consider the carrier frequency to be applicable for idle mode measurement reporting;
1> if validityArea is configured in VarMeasIdleConfig and UE reselects to a serving cell whose physical cell identity does not match any entry in validityArea for the corresponding carrier frequency:
2> stop T331;

Actions upon reception of SystemInformationBlockType5 is described. Section 5.2.2.12 of 3GPP TS 36.331 v15.6.0 may be referred.

Upon receiving SystemInformationBlockType5, the UE shall:
1> if in RRC_IDLE, the redistributionInterFreqInfo is included and the UE is redistribution capable:
2> perform E-UTRAN inter-frequency redistribution procedure;
1> if in RRC_IDLE, or in RRC_CONNECTED while T311 is running:
2> if the frequency band selected by the UE to represent a non-serving E UTRA carrier frequency is not a downlink only band:
3> if, for the selected frequency band, the freqBandInfo or the multiBandInfoList-v10j0 is present and the UE capable of multiNS-Pmax supports at least one additionalSpectrumEmission in the NS-PmaxList within freqBandInfo or multiBandInfoList-v10j0:
4> apply the first listed additionalSpectrumEmission which it supports among the values included in NS-PmaxList within freqBandInfo or multiBandInfoList-v10j0;
4> if the additionalPmax is present in the same entry of the selected additionalSpectrumEmission within NS-PmaxList:
5> apply the additionalPmax;
4> else:
5> apply the p-Max;
3> else:
4> apply the p-Max;
1> if in RRC_IDLE or RRC_INACTIVE and UE has stored VarMeasIdleConfig and the UE is capable of IDLE mode measurements for CA:
2> if T331 is running and VarMeasIdleConfig does not contain measIdleCarrierListEUTRA received from the RRCConnectionRelease message:
3> if SIB5 includes the measIdleConfigSIB:
4> store or replace the measIdleCarrierListEUTRA of measIdleConfigSIB within VarMeasIdleConfig;
3> else:
4> remove the measIdleCarrierListEUTRA in VarMeasIdleConfig, if stored;
2> perform idle mode measurements;

Upon receiving SystemInformationBlockType5-NB, the UE shall:
1> if in RRC_IDLE, or in RRC_CONNECTED while T311 is running:
2> if, for the frequency band selected by the UE (from multiBandInfoList) to represent a non-serving NB-IoT carrier frequency, the freqBandInfo is present and the UE capable of multiNS-Pmax supports at least one additionalSpectrumEmission in the NS-PmaxList within the freqBandInfo:
3> apply the first listed additionalSpectrumEmission which it supports among the values included in NS-PmaxList within freqBandInfo;
3> if the additionalPmax is present in the same entry of the selected additionalSpectrumEmission within NS-PmaxList:
4> apply the additionalPmax;
3> else:
4> apply the p-Max;
2> else:
3> apply the p-Max;

Reception of the RRCConnectionSetup by the UE is described. It may be referred to as Section 5.3.3.4 of 3GPP TS 36.331 v15.6.0 (2019 Jun. 29).

Prior to this, lower layer signalling is used to allocate a C-RNTI.

The UE shall:
1> set the content of RRCConnectionSetupComplete message as follows:
2> if the UE is connected to EPC:
3> except for NB-IoT:
4> if the SIB2 contains idleModeMeasurements, and the UE has IDLE mode measurement information available in VarMeasIdleReport:
5> include the idleMeasAvailable;
4> stop T331, if running;

Reception of the RRCConnectionResume by the UE is described. It may be referred to as Section 5.3.3.4a of 3GPP TS 36.331 v15.6.0 (2019 Jun. 29).

Prior to this, lower layer signalling is used to allocate a C-RNTI.

The UE shall:
1> set the content of RRCConnectionResumeComplete message as follows:
2> except for NB-IoT:
3> if resuming an RRC connection from a suspended RRC connection:
4> if the SIB2 contains idleModeMeasurements, and the UE has IDLE mode measurement information available in VarMeasIdleReport:
5> include the idleMeasAvailable;
4> stop T331, if running;

Meanwhile, when a UE is in RRC_IDLE and/or INACTIVE, the UE may perform neighbour cell measurement to support mobility. For example, a UE may perform early measurement on NR frequencies and/or LTE frequencies in idle state and/or inactive state.

In LTE, when a UE reports any available idle mode measurement results to the network after receiving request from the network, the UE may delete the measurement results only if the results are successfully delivered.

In NR early measurements, a network could indicate that the UE shall include NR measurement results. In this case, the UE could only report NR measurement results.

However, according to the existing wireless communication system (for example, existing LTE specification), measurement results can be deleted only if successfully delivered to the network. When the UE reports only indicated measurement results, not reported measurement results which is still stored in the UE may be outdated.

Therefore, studies for managing measurement results for early measurement in a wireless communication system are needed.

Hereinafter, a method and apparatus for managing measurement results for early measurement in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 10:
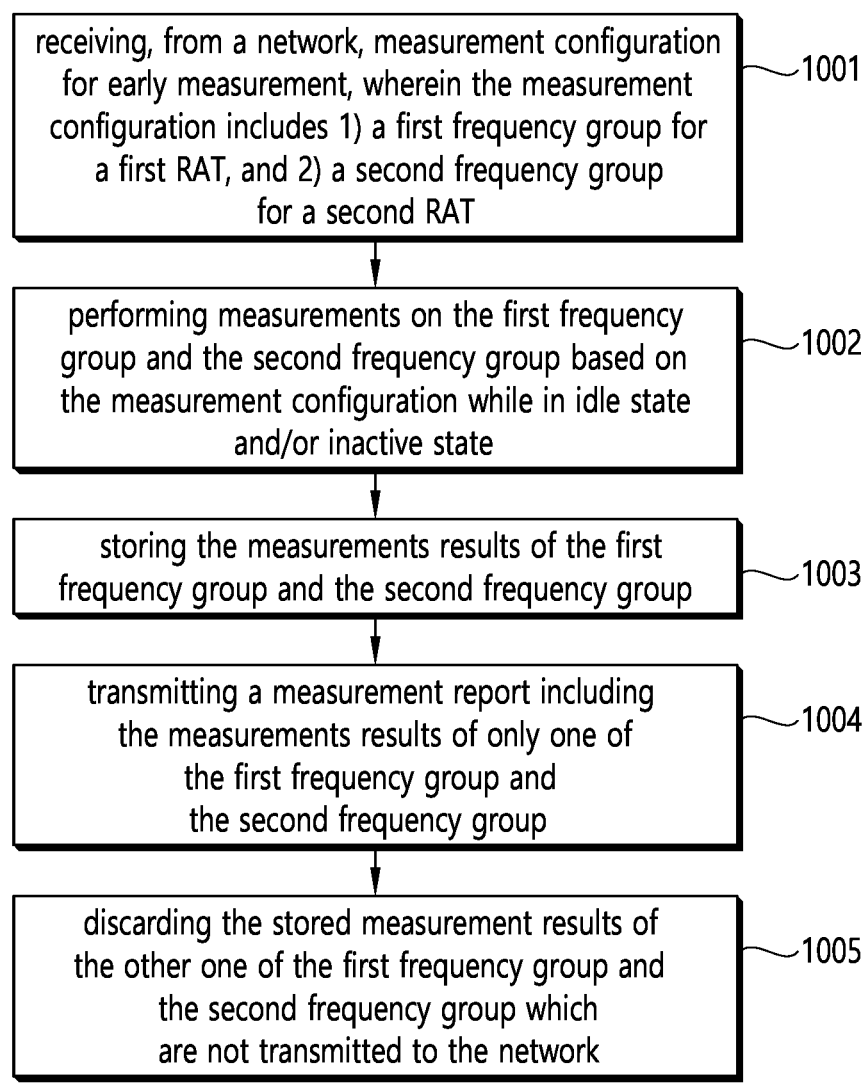
FIG. 10 shows an example of a method for managing measurement results for early measurement in a wireless communication system, according to some embodiments of the present disclosure.

FIG. 10 shows an example of a method for managing measurement results for early measurement in a wireless communication system, according to some embodiments of the present disclosure.

In particular, FIG. 10 shows an example of a method performed by a wireless device.

In step 1001, a wireless device may receive, from a network, measurement configuration for measurement in idle state and/or inactive state, wherein the measurement configuration includes 1) a first frequency group for a first Radio Access Technology (RAT), and 2) a second frequency group for a second RAT;

According to some embodiments of the present disclosure, the first RAT may be one of New Radio (NR) and Long-Term Evolution (LTE), and the second RAT may be another one of the NR and the LTE.

For example, if the first RAT is New Radio (NR), frequencies in the first frequency group may be operated for NR.

For example, if the second RAT is Long-Term Evolution (LTE), frequencies in the second frequency group may be operated for LTE.

According to some embodiments of the present disclosure, the measurement configuration may be provided via dedicated signalling or broadcast system information.

According to some embodiments of the present disclosure, a wireless device may receiving a Radio Resource Control (RRC) release message from the network. A wireless device may enter idle state and/or inactive state upon receiving the RRC release message.

In step 1002, a wireless device may perform measurements on the first frequency group and the second frequency group based on the measurement configuration while in idle state and/or inactive state.

For example, a wireless device may perform measurement on the first frequency group for NR and the second frequency group for LTE in idle state and/or inactive state.

In step 1003, a wireless device may store the measurements results of the first frequency group and the second frequency group.

In step 1004, a wireless device may transmit a measurement report including the measurements results of only one of the first frequency group and the second frequency group.

According to some embodiments of the present disclosure, a wireless device may receive, from the network, a request for the measurement results. A wireless device may transmit the measurement report in response to the request for the measurement results.

For example, a wireless device may receive UE information request message including the request for the measurement results.

For example, a wireless device may select a cell while in idle state and/or inactive state. A wireless device may receive the request for the measurement results from the selected cell.

For example, the request for the measurement results may include an indication indicating for which one of the measurement results for the first RAT or the second RAT is need to be included in the measurement report.

For example, a wireless device may generate the measurement report including the measurement results of only one of the first frequency group and the second frequency group based on the indication included in the request for the measurement results.

For example, if the indication indicates that the measurement results for the first RAT is need to be included in the measurement report, a wireless device may include the measurement results of the first frequency group in the measurement report.

For example, if the indication indicates that the measurement results for the second RAT is need to be included in the measurement report, a wireless device may include the measurement results for the second frequency group in the measurement report.

For example, the measurement report may be included in UE information response message.

In step 1005, a wireless device may discard the stored measurement results of the other one of the first frequency group and the second frequency group which are not transmitted to the network.

According to some embodiments of the present disclosure, a wireless may discard the stored measurement results of the other one of the first frequency group and the second frequency group upon receiving the request for the measurement results which is not indicated by the indication included in the request for the measurement results, received in step 1004. For example, if the indication indicates that the measurement results for the first RAT is need to be included in the measurement report, a wireless device may discard the stored measurement results of the second frequency group.

For example, if the indication indicates that the measurement results for the second RAT is need to be included in the measurement report, a wireless device may discard the stored measurement results of the first frequency group.

According to some embodiments of the present disclosure, a wireless device may discarding the stored measurement results of the one of the first frequency group and the second frequency group which are transmitted to the network.

For example, a wireless device may discard the stored measurement results of the one of the first frequency group and the second frequency group which are transmitted to the network after generating the measurement report in step 1004.

For example, a wireless device may discard the stored measurement results of the one of the first frequency group and the second frequency group which are transmitted to the network after transmitting the measurement report in step 1004.

According to some embodiments of the present disclosure, the wireless device may be in communication with at least one of a user equipment, a network, or an autonomous vehicle other than the wireless device.

Figure 11:
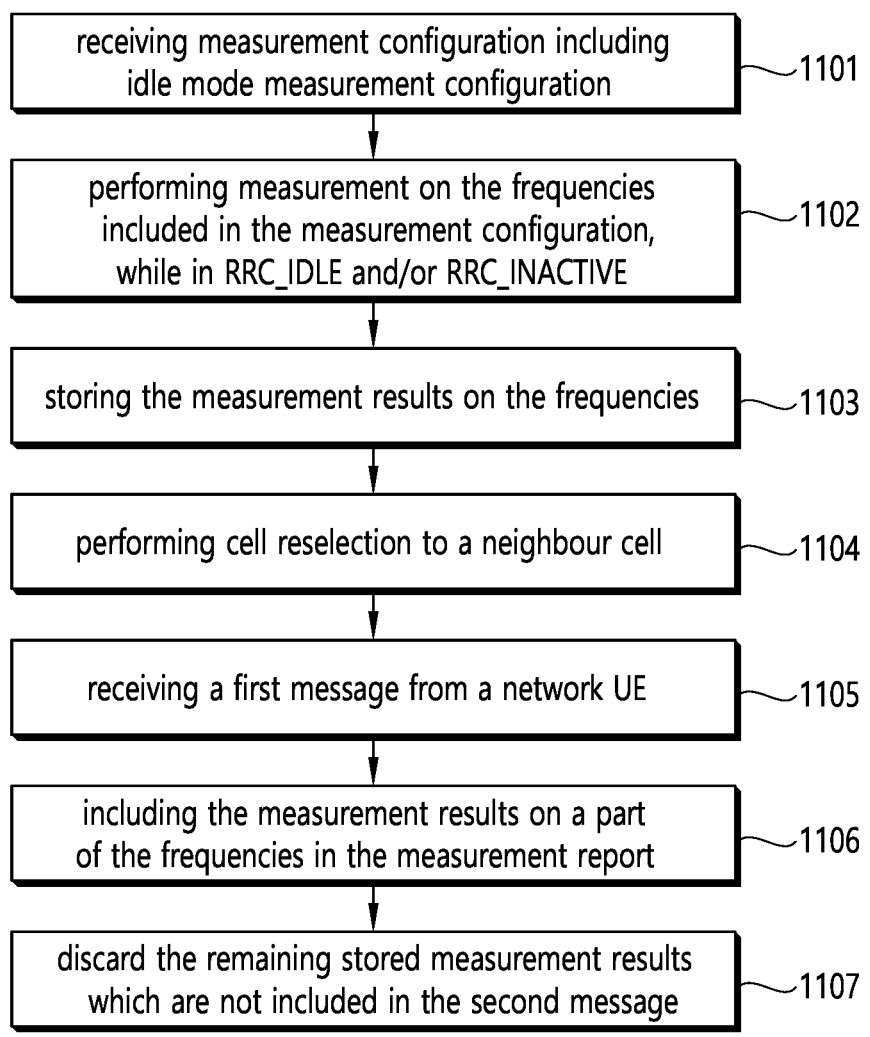
FIG. 11 shows an example of a method for managing measurement results for early measurement in a wireless communication system, according to some embodiments of the present disclosure.

FIG. 11 shows an example of a method for managing measurement results for early measurement in a wireless communication system, according to some embodiments of the present disclosure.

In particular, FIG. 11 shows an example of a method performed by a wireless device, for example, a UE.

In FIG. 11, upon measurement results reporting, UE may discard the measurement results which are not reported to the network. According to some embodiments of the present disclosure, when a UE reports measurement results based on the indication provided by the network which indicates which to be reported, UE may discard the measurement results which are not reported to the network.

In Step 1101, a UE may receive measurement configuration. The measurement configuration may include idle mode measurement configuration. The measurement configuration may include a frequency list.

For example, the measurement configuration may be provided via dedicated signalling. For example, the measurement configuration may be provided via broadcast system information.

For example, the frequency list may include NR frequency.

For example, the frequency list may include E-UTRA frequency.

In step 1102, the UE may perform measurement on the frequencies in the frequency list received in step 1101, while in RRC_IDLE and/or RRC_INACTIVE.

In step 1103, the UE may store the measurement results on the frequencies.

In step 1104, the UE may perform cell reselection to a neighbour cell.

In step 1105, the UE may receive a first message from a network.

According to some embodiments of the present disclosure, the first message may include UEInformationRequest.

According to some embodiments of the present disclosure, the first message may include the first indication to request UE to report the measurement results. If the first indication is included in the first message, the UE may report the measurement results stored in step 1103 to the network.

According to some embodiments of the present disclosure, the first message may include the second indication to indicate which measurement result is to be reported to the network among the measurement results.

For example, the second indication may indicate on which frequencies measurement result is to be included in the measurement result reporting.

For example, the second indication may indicate for which RAT measurement result is to be included in the measurement result reporting. For example, the RAT may include NR.

For example, the RAT may include E-UTRA.

In step 1106, a UE may include the measurement results on a part of the frequencies in the measurement report. A UE may transmit the measurement report to the network.

For example, if the first indication is included in the first message received in step 1105, the UE may include the measurement results stored in step 1103 in a second message and transmits the second message to the network. For example, the second message may include the measurement report.

According to some embodiments of the present disclosure, the second message may include UEInformationResponse.

According to some embodiments of the present disclosure, if the second indication is included in the first message received in step 1105, the UE may include corresponding measurement results in the second message.

For example, if the second indication indicates frequency list for which measurement result is to be reported, the UE may include measurement results of the corresponding frequencies which are included in the frequency list included in the second indication.

For example, if the second indication indicates for which RAT measurement result is to be included, the UE may include measurement results of the frequencies of the corresponding RAT indicated by the second indication. For example, if the second indication indicates 'NR', the UE may include measurement results of NR frequencies.

In step 1107, the UE may discard the remaining stored measurement results which are not included in the second message.

For example, if the second message is successfully transmitted in step 1106, the UE may discard the measurement results included in the second message.

Figure 12:
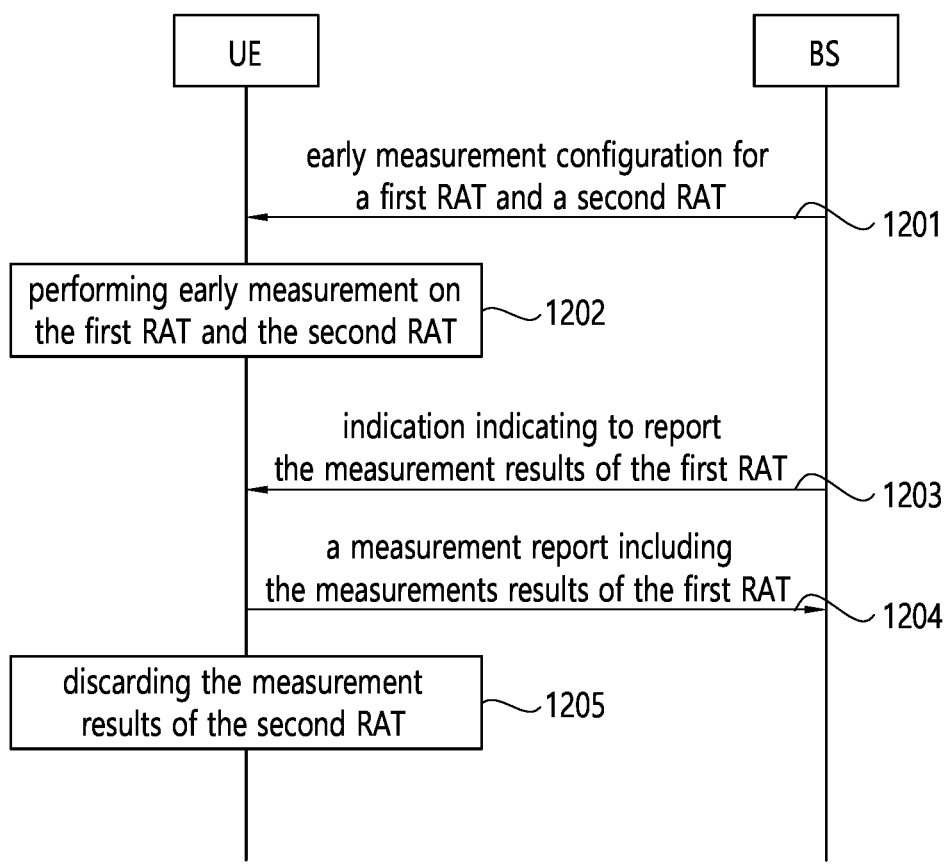
FIG. 12 shows an example for reporting measurement results for early measurement in a wireless communication system, according to some embodiments of the present disclosure.

FIG. 12 shows an example for reporting measurement results for early measurement in a wireless communication system, according to some embodiments of the present disclosure.

In particular, FIG. 12 shows an example of a method performed by a wireless device and a network, for example, a UE and a base station (BS).

In step 1201, a UE may receive, from a BS, early measurement configuration for a first RAT and a second RAT.

For example, a UE may receive, from a BS, measurement configuration for early measurement. The measurement configuration may include 1) a first frequency group for a first RAT, and 2) a second frequency group for a second RAT.

In step 1202, a UE may perform the early measurements on the first RAT and the second RAT.

For example, a UE may perform measurements on the first frequency group and the second frequency group based on the measurement configuration while in idle state and/or inactive state.

For example, a UE may store the measurements results of the first frequency group and the second frequency group while in idle state and/or inactive state.

In step 1203, a UE may receive, from the BS, an indication indicating one of the first RAT and the second RAT. For example, the indication may indicate indication indicating for which one of the measurement results for the first RAT or the second RAT is need to be included in the measurement report. For example, in this case, the indication may indicate to report only the measurement results of the first RAT.

For example, a UE may receive, from the BS, a request for the measurement results and the request for the measurement may include the indication. For example, a UE may receive, UE information request message as the request for the measurement results and the UE information request message may include the indication.

In step 1204, a UE may transmit, to the BS, a measurement report including the indicated measurements results.

For example, the UE may transmit, to the BS, measurement report including the measurement results of the first RAT.

In step 1205, a UE may discard the measurement results which is not transmitted to the BS. For example, the UE may discard the measurement results of the second RAT.

For example, a UE may delete the measurement results of the second RAT upon transmitting the measurement report in step 1204.

Figure 13:
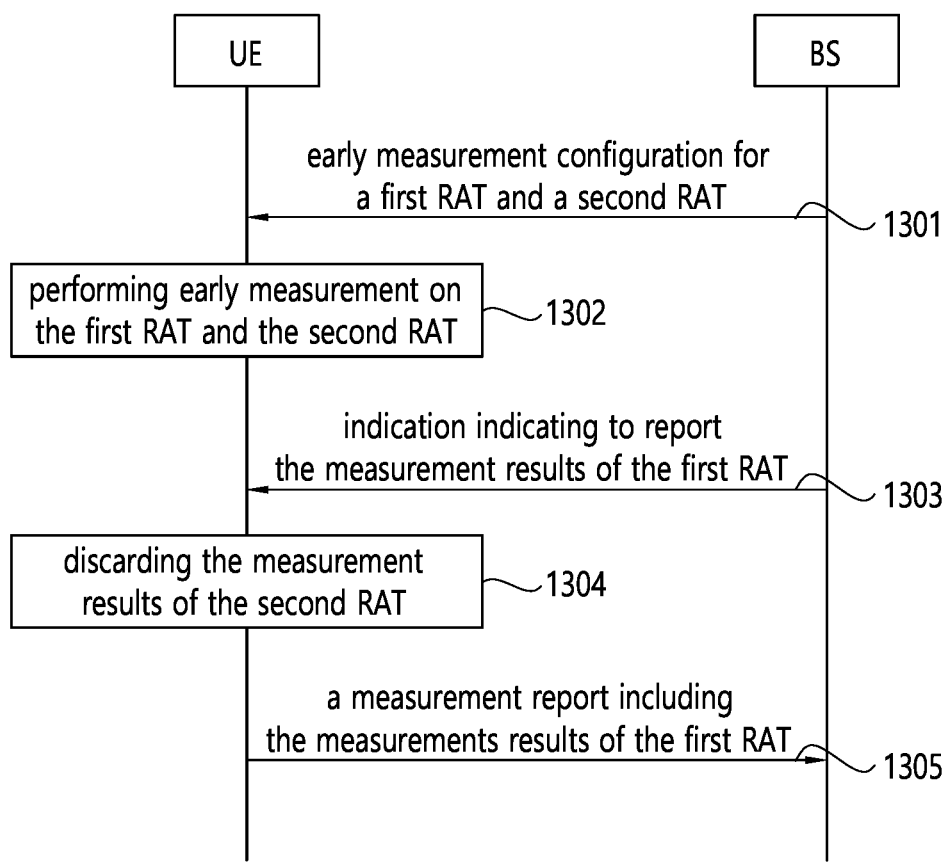
FIG. 13 shows an example for reporting measurement results for early measurement in a wireless communication system, according to some embodiments of the present disclosure.

FIG. 13 shows an example for reporting measurement results for early measurement in a wireless communication system, according to some embodiments of the present disclosure. The detailed description overlapping with the above-described contents in FIG. 12 will be omitted or simplified.

In step 1301, a UE may receive, from a BS, early measurement configuration for a first RAT and a second RAT.

In step 1302, a UE may perform the early measurements on the first RAT and the second RAT.

In step 1303, a UE may receive, from the BS, an indication indicating to report only the measurement results of the first RAT.

In step 1304, a UE may discard the measurement results which is not indicated by the indication. For example, the UE may discard the measurement results of the second RAT upon receiving the indication for the first RAT in step 1203.

In step 1305, a UE may transmit, to the BS, a measurement report including the measurement results of the first RAT.

Hereinafter, an apparatus for managing measurement results for early measurement in a wireless communication system, according to some embodiments of the present disclosure, will be described. Herein, the apparatus may be a wireless device (100 or 200) in FIGS. 2, 3, and 5.

For example, a wireless device may perform methods described in FIGS. 10 and 11. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, measurement configuration for early measurement, wherein the measurement configuration includes 1) a first frequency group for a first Radio Access Technology (RAT), and 2) a second frequency group for a second RAT. The processor 102 may be configured to perform measurements on the first frequency group and the second frequency group based on the measurement configuration while in idle state and/or inactive state. The processor 102 may be configured to store the measurements results of the first frequency group and the second frequency group. The processor 102 may be configured to control the transceiver 106 to transmit a measurement report including the measurements results of only one of the first frequency group and the second frequency group. The processor 102 may be configured to discard the stored measurement results of the other one of the first frequency group and the second frequency group which are not transmitted to the network.

According to some embodiments of the present disclosure, the processor 102 may be configured to control the transceiver 106 to receive, from the network, a request for the measurement results. For example, the measurement report may be transmitted in response to the request for the measurement results.

For example, the request for the measurement results may include an indication indicating for which one of the measurement results for the first RAT or the second RAT is need to be included in the measurement report. For example, the request for the measurement results may be included in UE information request message.

For example, the processor 102 may be configured to generate the measurement report including the measurement results of only one of the first frequency group and the second frequency group based on the indication included in the request for the measurement results. For example, the measurement report may be included in UE information response message.

For example, upon receiving the request for the measurement results, the processor 102 may be configured to discard the stored measurement results of the other one of the first frequency group and the second frequency group which is not indicated by the indication included in the request for the measurement results.

For example the processor 102 may be configured to select a cell while in idle state and/or inactive state. The request for the measurement results may be transmitted from the selected cell.

According to some embodiments of the present disclosure, the measurement configuration may be provided via dedicated signalling and/or broadcast system information.

According to some embodiments of the present disclosure, the processor 102 may be configured to control the transceiver 106 to receive a Radio Resource Control (RRC) release message from the network. The processor 102 may be configured to enter idle state and/or inactive state upon receiving the RRC release message.

According to some embodiments of the present disclosure, the processor 102 may be configured to discard the stored measurement results of the one of the first frequency group and the second frequency group which are transmitted to the network.

According to some embodiments of the present disclosure, the first RAT may be one of New Radio (NR) and Long-Term Evolution (LTE), and the second RAT may be another one of the NR and the LTE.

According to some embodiments of the present disclosure, the processor 102 may be configured to be in communication with at least one of a user equipment, a network, or an autonomous vehicle other than the wireless device.

Hereinafter, a processor for a wireless device for managing measurement results for early measurement in a wireless communication system, according to some embodiments of the present disclosure, will be described.

The processor may be configured to control the wireless device to receive, from a network, measurement configuration for early measurement, wherein the measurement configuration includes 1) a first frequency group for a first Radio Access Technology (RAT), and 2) a second frequency group for a second RAT. The processor may be configured to control the wireless device to perform measurements on the first frequency group and the second frequency group based on the measurement configuration while in idle state and/or inactive state. The processor may be configured to control the wireless device to store the measurements results of the first frequency group and the second frequency group. The processor may be configured to control the wireless device to transmit a measurement report including the measurements results of only one of the first frequency group and the second frequency group. The processor may be configured to control the wireless device to discard the stored measurement results of the other one of the first frequency group and the second frequency group which are not transmitted to the network.

According to some embodiments of the present disclosure, the processor may be configured to control the wireless device to receive, from the network, a request for the measurement results. For example, the measurement report may be transmitted in response to the request for the measurement results.

For example, the request for the measurement results may include an indication indicating for which one of the measurement results for the first RAT or the second RAT is need to be included in the measurement report. For example, the request for the measurement results may be included in UE information request message.

For example, the processor may be configured to control the wireless device to generate the measurement report including the measurement results of only one of the first frequency group and the second frequency group based on the indication included in the request for the measurement results. For example, the measurement report may be included in UE information response message.

For example, upon receiving the request for the measurement results, The processor may be configured to control the wireless device to discard the stored measurement results of the other one of the first frequency group and the second frequency group which is not indicated by the indication included in the request for the measurement results.

For example the processor may be configured to control the wireless device to select a cell while in idle state and/or inactive state. The request for the measurement results may be transmitted from the selected cell.

According to some embodiments of the present disclosure, the measurement configuration may be provided via dedicated signalling and/or broadcast system information.

According to some embodiments of the present disclosure, the processor may be configured to control the wireless device to receive a Radio Resource Control (RRC) release message from the network. The processor may be configured to control the wireless device to enter idle state and/or inactive state upon receiving the RRC release message.

According to some embodiments of the present disclosure, the processor may be configured to control the wireless device to discard the stored measurement results of the one of the first frequency group and the second frequency group which are transmitted to the network.

According to some embodiments of the present disclosure, the first RAT may be one of New Radio (NR) and Long-Term Evolution (LTE), and the second RAT may be another one of the NR and the LTE.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for managing measurement results for early measurement in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, measurement configuration for early measurement, wherein the measurement configuration includes 1) a first frequency group for a first Radio Access Technology (RAT), and 2) a second frequency group for a second RAT. The stored a plurality of instructions may cause the wireless device to perform measurements on the first frequency group and the second frequency group based on the measurement configuration while in idle state and/or inactive state. The stored a plurality of instructions may cause the wireless device to store the measurements results of the first frequency group and the second frequency group. The stored a plurality of instructions may cause the wireless device to transmit a measurement report including the measurements results of only one of the first frequency group and the second frequency group. The stored a plurality of instructions may cause the wireless device to discard the stored measurement results of the other one of the first frequency group and the second frequency group which are not transmitted to the network.

According to some embodiments of the present disclosure, the stored a plurality of instructions may cause the wireless device to receive, from the network, a request for the measurement results. For example, the measurement report may be transmitted in response to the request for the measurement results.

For example, the request for the measurement results may include an indication indicating for which one of the measurement results for the first RAT or the second RAT is need to be included in the measurement report. For example, the request for the measurement results may be included in UE information request message.

For example, the stored a plurality of instructions may cause the wireless device to generate the measurement report including the measurement results of only one of the first frequency group and the second frequency group based on the indication included in the request for the measurement results. For example, the measurement report may be included in UE information response message.

For example, upon receiving the request for the measurement results, the stored a plurality of instructions may cause the wireless device to discard the stored measurement results of the other one of the first frequency group and the second frequency group which is not indicated by the indication included in the request for the measurement results.

For example, the stored a plurality of instructions may cause the wireless device to select a cell while in idle state and/or inactive state. The request for the measurement results may be transmitted from the selected cell.

According to some embodiments of the present disclosure, the measurement configuration may be provided via dedicated signalling and/or broadcast system information.

According to some embodiments of the present disclosure, the stored a plurality of instructions may cause the wireless device to receive a Radio Resource Control (RRC) release message from the network. The stored a plurality of instructions may cause the wireless device to enter idle state and/or inactive state upon receiving the RRC release message.

According to some embodiments of the present disclosure, the stored a plurality of instructions may cause the wireless device to discard the stored measurement results of the one of the first frequency group and the second frequency group which are transmitted to the network.

According to some embodiments of the present disclosure, the first RAT may be one of New Radio (NR) and Long-Term Evolution (LTE), and the second RAT may be another one of the NR and the LTE.

According to some embodiments of the present disclosure, the stored a plurality of instructions may cause the wireless device to be in communication with at least one of a user equipment, a network, or an autonomous vehicle other than the wireless device.

Hereinafter, a method for managing measurement results for early measurement performed by a base station (BS) in a wireless communication system, according to some embodiments of the present disclosure, will be described.

The BS may transmit, to a wireless device, measurement configuration for early measurement, wherein the measurement configuration includes 1) a first frequency group for a first Radio Access Technology (RAT), and 2) a second frequency group for a second RAT.

The BS may transmit, to a wireless device, a request for the measurement results including an indication which indicates for which one of the measurement results for the first RAT or the second RAT is need to be included in the measurement report.

The BS may receive, form a wireless device, a measurement report including the measurements results of only one of the first frequency group and the second frequency group.

Hereinafter, a base station (BS) for managing measurement results for early measurement in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, measurement configuration for early measurement, wherein the measurement configuration includes 1) a first frequency group for a first Radio Access Technology (RAT), and 2) a second frequency group for a second RAT.

The processor may be configured to control the transceiver to transmit, to a wireless device, a request for the measurement results including an indication which indicates for which one of the measurement results for the first RAT or the second RAT is need to be included in the measurement report.

The processor may be configured to control the transceiver to receive, form a wireless device, a measurement report including the measurements results of only one of the first frequency group and the second frequency group.

The present disclosure can have various advantageous effects.

According to some embodiments of the present disclosure, a wireless device could manage measurement results for early measurement efficiently in a wireless communication system.

For example, when a wireless device receives early measurement configuration with frequency list of NR frequencies and E-UTRA frequencies, the wireless device may perform early measurement on all the configured frequencies and store the measurement results. When the wireless device transit to RRC_CONNECTED and if the network requests to report the measurement results with indication to report only measurement results of NR frequencies, then measurement results of LTE frequencies are not reported to the network. If only the measurement results of NR frequencies are discarded after reporting, a wireless device could waste resources for the stored measurement results of LTE frequencies. According to some embodiments of the present disclosure, a wireless device could save resources by discarding the stored measurement results which is not reported.

For example, a wireless communication system could provide an efficient way to manage measurement results for early measurement for a wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
    receiving, from a network via broadcast system information, measurement configuration for measurement in an idle state and/or an inactive state,
    wherein the measurement configuration includes (i) a first frequency list including one or more New Radio (NR) frequencies, and (ii) a second frequency list including one or more Long-Term Evolution (LTE) frequencies;
    performing measurements on (i) the one or more NR frequencies included in the first frequency list and (ii) the one or more E-UTRA frequencies included in the second frequency list, based on the measurement configuration while in the idle state and/or the inactive state;
    storing the measurements results on (i) the one or more NR frequencies included in the first frequency list and (ii) the one or more E-UTRA frequencies included in the second frequency list;
    receiving, from the network, a UE information request message including a first indication to request a measurement report for the measurement results performed in the idle state and/or the inactive state,
    wherein the UE information request message includes a second indication indicating only one of (i) measurement results on the first frequency list or (ii) measurement results on the second frequency list to be included in the measurement report;
    transmitting, to the network, a UE information response message including the measurement report,
    wherein the measurement report includes only one of (i) the measurement results on the first frequency list or (ii) the measurement results on the second frequency list based on the second indication; and
    discarding the other one of (i) the measurement results on the first frequency list or (ii) the measurement results on the second frequency list based on the second, not included in the measurement report, upon receiving the second indication.

2. The method of claim 1, wherein the method further comprises,
    generating the measurement report including only one of (i) measurement results on the first frequency list or (ii) measurement results on the second frequency list based on the first indication.

3. The method of claim 1, wherein the method further comprises,
    selecting a cell while in the idle state and/or the inactive state,
    wherein the request for the UE information request message is transmitted from the selected cell.

4. The method of claim 1, wherein the method further comprises,
    receiving a Radio Resource Control (RRC) release message from the network; and
    entering the idle state and/or the inactive state upon receiving the RRC release message.

5. The method of claim 1, wherein the method further comprises,
    discarding the only one of (i) the measurement results on the first frequency list or (ii) the measurement results on the second frequency list based on the second, included in the measurement report, upon transmitting the UE information response message.

6. The method of claim 1, wherein the wireless device is in communication with at least one of a user equipment, a network, or an autonomous vehicle other than the wireless device.

7. A wireless device in a wireless communication system comprising:
    a transceiver;
    a memory; and
    at least one processor operatively coupled to the transceiver and the memory, and configured to:
    control the transceiver to receive, from a network via broadcast system information, measurement configuration for measurement in an idle state and/or an inactive state,
    wherein the measurement configuration includes (i) a first frequency list including one or more New Radio (NR) frequencies, and 2) a second frequency list including one or more Long-Term Evolution (LTE) frequencies;
    perform measurements on (i) the one or more NR frequencies included in the first frequency list and (ii) the one or more E-UTRA frequencies included in the second frequency list based on the measurement configuration while in idle state and/or the inactive state;
    store the measurements results on (i) the one or more NR frequencies included in the first frequency list and (ii) the one or more E-UTRA frequencies included in the second frequency list;
    control the transceiver to receive, from the network, a UE information request message including a first indication to request a measurement report for the measurement results performed in the idle state and/or the inactive state, wherein the UE information request message includes a second indication indicating only one of (i) measurement results on the first frequency list or (ii) measurement results on the second frequency list to be included in the measurement report;

control the transceiver to transmit, to the network, a UE information response message including the measurement report, wherein the measurement report includes only one of (i) the measurement results on the first frequency list or (ii) the measurement results on the second frequency list based on the second indication; and discard the other one of (i) the measurement results on the first frequency list or (ii) the measurement results on the second frequency list based on the second, not included in the measurement report, upon receiving the second indication.

8. A non-transitory computer-readable medium storing thereon a plurality of instructions, which, based on being executed by a processor of a wireless device, cause the wireless device to:

receive, from a network via broadcast system information, measurement configuration for measurement in an idle state and/or an inactive state, wherein the measurement configuration includes (i) a first frequency list including one or more New Radio (NR) frequencies, and (ii) a second frequency list including one or more Long-Term Evolution (LTE) frequencies;

perform measurements on (i) the one or more NR frequencies included in the first frequency list and (ii) the one or more E-UTRA frequencies included in the second frequency list, based on the measurement configuration while in the idle state and/or the inactive state;

store the measurements results on (i) the one or more NR frequencies included in the first frequency list and (ii) the one or more E-UTRA frequencies included in the second frequency list;

receive, from the network, a UE information request message including a first indication to request a measurement report for the measurement results performed in the idle state and/or the inactive state, wherein the UE information request message includes a second indication indicating only one of (i) measurement results on the first frequency list or (ii) measurement results on the second frequency list to be included in the measurement report;

transmit, to the network, a UE information response message including the measurement report, wherein the measurement report includes only one of (i) the measurement results on the first frequency list or (ii) the measurement results on the second frequency list based on the second indication; and discard the other one of (i) the measurement results on the first frequency list or (ii) the measurement results on the second frequency list based on the second, not included in the measurement report, upon receiving the second indication.

* * * * *